(12) United States Patent
Nookula et al.

(10) Patent No.: US 11,677,634 B1
(45) Date of Patent: Jun. 13, 2023

(54) SELECTING AND DEPLOYING MODELS BASED ON SENSOR AVAILABILITY

(71) Applicant: Amazon Technologies, Inc., Seattle, WA (US)

(72) Inventors: Nagajyothi Nookula, Irvne, CA (US); Eduardo Calleja, Redwood City, CA (US); Poorna Chand Srinivas Perumalla, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 53 days.

(21) Appl. No.: 16/559,881

(22) Filed: Sep. 4, 2019

(51) Int. Cl.
*H04L 41/14* (2022.01)
*H04L 67/12* (2022.01)

(52) U.S. Cl.
CPC ............ *H04L 41/145* (2013.01); *H04L 67/12* (2013.01)

(58) Field of Classification Search
None
See application file for complete search history.

(56) References Cited

U.S. PATENT DOCUMENTS

| 2008/0263150 | A1* | 10/2008 | Childers | H04L 67/01 |
| | | | | 709/203 |
| 2014/0380264 | A1 | 12/2014 | Misra et al. | |
| 2016/0261425 | A1* | 9/2016 | Horton | H04L 67/1097 |
| 2017/0006116 | A1 | 1/2017 | Kelly et al. | |

* cited by examiner

*Primary Examiner* — Kouroush Mohebbi
(74) *Attorney, Agent, or Firm* — S. Scott Foster; Kowert, Hood, Munyon, Rankin & Goetzel, P.C.

(57) ABSTRACT

A model selection and deployment service at a provider network receives an indication of sensor availability from a remote client device (e.g., what type of sensors are currently available to provide sensor data to the client device). The model selection and deployment service then selects, based on the sensor availability (and/or based on one or more other factors/criteria), a data processing model from a group of data processing models that are available for deployment to the client device. The model selection and deployment service then transmits the selected data processing model to the remote client device (e.g., for installation on the hub device). This may allow a client device to use the best data processing model for a sensor configuration and to dynamically adjust to any changes in the sensor configuration.

20 Claims, 9 Drawing Sheets

SELECTING AND DEPLOYING MODELS BASED ON SENSOR AVAILABILITY

BACKGROUND

The Internet of Things (IoT) is a phrase given for the interconnection of computing devices scattered around the globe within the existing internet infrastructure. IoT devices may be used for a variety of applications. For example, an IoT device (e.g., a hub device of a local network) may include a data processing model that analyzes data gathered from various sensors on the network (e.g., temperature, pressure) to make a prediction that it will rain within a certain amount of time (e.g., within the next hour).

A given data processing model may be designed to process certain types of input data collected at a local network. For example, a weather prediction model may be designed to process input from one or more temperature sensors and input from one or more pressure sensors in order to make a prediction of whether or not it will rain. At some point, a new type of sensor may be available. For example, a humidity sensor may be installed on the local network or onto the hub device. However, the data processing model may not be designed to process certain types of input data, including humidity. Therefore, the model would be unable to take advantage of the humidity sensor in order to form weather predictions. In some cases, a sensor may fail or may be removed, causing a model to be inoperable or to produce a less accurate result. For example, if a pressure sensor fails, the model may be unable to generate a weather prediction (or generate a less accurate prediction) until a replacement sensor is acquired and installed.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for selecting and deploying models based on sensor availability at a client network (e.g., the sensors currently available to provide input data for a model). In embodiments, a model selection and deployment service at a provider network may select and deploy a model to a hub device of a remote client network based on what types of sensors (e.g., temperature, pressure, etc.) are currently available on the client network to provide sensor input to a model (e.g., a model installed on a the hub device). When a new sensor is added to the client network or an existing sensor is removed from the client network, a new model may be downloaded to the client network that is compatible with the new sensor availability and/or is best suited for the new sensor availability (e.g., based on the available sensors and model performance criteria specified by the client).

In embodiments, a model selection and deployment service at a provider network receives an indication of sensor availability from a remote site (e.g., a remote network and/or device of a client). For example, a hub device of a remote client network may send a request or message to the provider network that indicates what type of sensors are currently available to provide input to the hub device. In some embodiments, the remote device of the client may be a stand-alone device that is not a part of a local network of the client (e.g., a cell phone or other remote device that is not a part of a network of different client devices). Therefore, the phrase "client network" or "network" used herein may, in embodiments, be replaced with "client device" or "device." In embodiments, the phrase "remote site" may be a remote client device and/or a remote client network (e.g., a remote client hub device, a remote client stand-alone device, etc.).

The model selection and deployment service then selects, based on the sensor availability (and/or based on one or more other factors/criteria), a data processing model from among a group of data processing models that are available for deployment to the hub device. The model selection and deployment service then transmits the selected data processing model to the remote device (e.g., for installation on the hub device).

As used herein, a model may be any data processing model suitable for processing input data to generate one or more results. For example, a model may include a neural network, deep neural network, static or dynamic neural network, a memory network, and/or any other model architecture suitable for processing input data (e.g., from sensors) and generating one or more results/predictions. Thus, in embodiments, a model may include any computational model, machine learning model, or artificial intelligence model suitable for processing data and generating one or more results. Moreover different models may include different model architectures and/or be trained based on the same or different training data.

In various embodiments, any suitable security communication protocols may be used to protect data that is being sent between any devices (e.g., edge devices, hub devices, servers, etc.) and between devices of different networks (e.g., client networks, provider networks). For example, data may be encrypted using SSL (secure socket layer), TLS (transport layer security), HTTPS (secure hypertext transfer protocol), and/or any other suitable network security protocol.

In embodiments, any of the data collected by a sensor may be converted into training data and used to train models and/or generate updates to models. Thus, in some embodiments, analyzing/processing sensor data may include creating training data and creating modifications and/or updates to the model based on the training data. In some embodiments, the updated model may be transmitted to the provider network (e.g., for storage in a model data store) for future use when deploying the model (e.g., instead of deploying the previous version of the model).

In some embodiments, a model may produce a result as a "prediction." In embodiments, a model may be trained (e.g., using a set of training data) and then can processes other data at a later point in time to make one or more predictions. In various embodiments, any other suitable result (e.g., non-"prediction" result) may be substituted for a prediction. A result may be an identification (e.g., classification) based on data received from a sensor. For example, a result may be an identification of a particular person, animal, or object based on analysis of image data using an image classifier. In some embodiments, the word "prediction" may be used instead of "result," and vice versa. Moreover, a prediction may be a result that identifies a current state, a predicted outcome, or a predicted future state for an object, environment, person, animal, or anything else that may change state or location over time. A prediction may be a probabilistic output (e.g., 90% chance that an animal in a photo is a dog). In embodiments, a prediction may be a temperature of an area or location of an object at a current time or at a later time (e.g., five seconds after the current time). In some embodiments, predictions may be bounding boxes around certain types of objects in an image or may be generated responses of a system to one or more environmental conditions and/or events.

Figure 1:
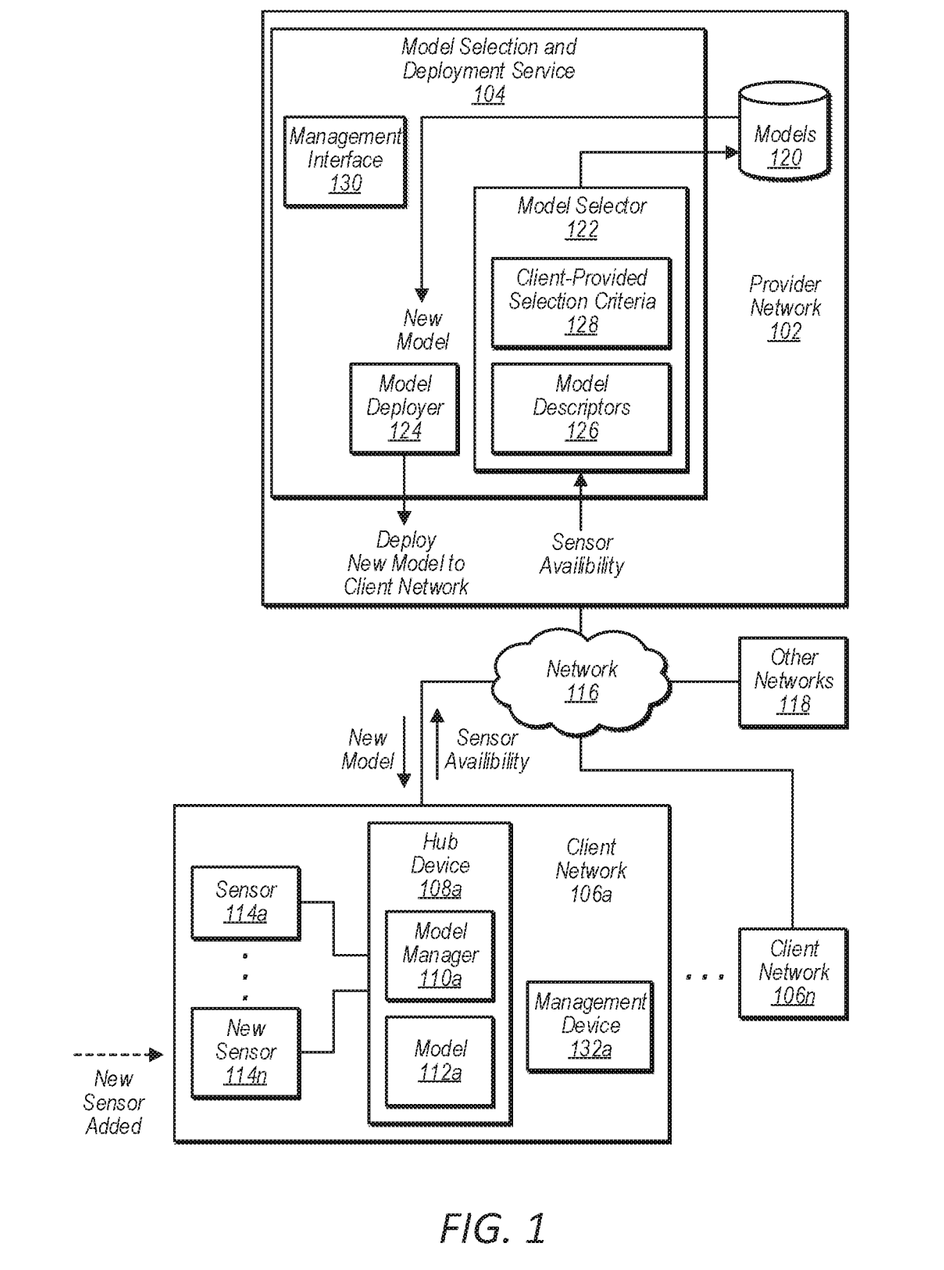
FIG. 1 illustrates a system for selecting and deploying models based on sensor availability, according to some embodiments.

FIG. 1 illustrates a system for selecting and deploying models based on sensor availability, according to some embodiments. A provider network 102, model selection and deployment service 104, client network 106, hub device 108, and any other components depicted in FIG. 1 may be the same as or include one or more of the same components as the provider network, model selection and deployment service, client network, hub device, and any other components discussed in any of FIGS. 2-9, in embodiments. In various embodiments, the provider network, model selection and deployment service, client network, hub device, and any other components discussed in any one of FIGS. 1-9 may be the same component as (e.g., same type of component) or include one or more of the same components as the provider network, model selection and deployment service, client network, hub device, and any other components discussed in any other one of FIGS. 1-9.

Although FIGS. 1-9 may describe a single hub device of a local network, in various embodiments any number of hub devices (e.g., using the same model) may be used instead of a single hub device. For example, in some embodiments, multiple hub devices may be used as redundant hub devices to add fault-tolerance to the system. If one or more hub devices fail, a remaining one or more hub devices may continue to operate as described. Thus, in embodiments, a hub device may synchronize state with one or more other hub devices (e.g., at periodic intervals or upon detecting an event such as addition of a new hub device or failure of a hub device).

In some embodiments, two or more hub devices may collectively perform the various described operations instead of just one hub device. Thus, two or more hub devices may each perform a particular portion of the described operations (e.g., implementing distributed processing). In other embodiments, a combination of redundant and distributed processing may be implemented via two or more hub devices.

In the depicted embodiment, the hub device 108 includes a model manager 110 and a model 112. In embodiments, the model manager 110 may perform any actions associated with the hub device described herein, such as communicating the sensor availability to the provider network or downloading new models from the client network. The model 112 may receive sensor data (e.g., temperature, pressure, etc.) from any number of sensors 114 and process the received data to generate one or more results (e.g., a prediction).

In embodiments, the model 112 may include software and/or hardware that performs one or more operations on received input data. In embodiments, the one or more operations may include analyzing the data, modifying the data based on the analyzing, and/or generating a result based on the analyzing (e.g., prediction, classification, new data, one or more commands, or some other result). In embodiments, the result may be forwarded to another device/endpoint at the client network and/or the provider network and may cause one or more actions to be performed at the other device/endpoint (e.g., generate a notification that is sent to the client or administrator, trigger physical movement via an actuator, etc.). In embodiments, the hub device (e.g., the model manager) may generate a command or other message based on the result, and the command/message may cause the hub device 100 to perform an action or may be transmitted to another device/endpoint of the client network and/or the provider network to cause one or more actions to be performed at the other device/endpoint.

In some embodiments, client devices on the client network 106 (or a stand-alone client device) may communicate with the provider network 102 by transmitting data via a wide-area network 116 (e.g., the internet). Thus, the provider network 102 may be considered a remote provider network with respect to the client device and may be in another physical location than the client device/client network (e.g., another building, city, state, or country). As depicted, devices of any number of client networks 106 (e.g., corresponding to different clients of the model selection and deployment service) and/or devices of other networks 118 may communicate with the provider network via the network 116.

In the depicted embodiment, the provider network 102 includes a data store of models 120 that are available for deployment to client networks. In embodiments, some or all of the models may be data processing models provided by the client (e.g., uploaded from the client network) and stored by the provider network, data processing models provided by the model selection and deployment service (e.g., standard models with default settings) and available for deployment to different clients, and/or data processing models provided by a third party network. (e.g., one or more other networks 118).

As shown, the model selection and deployment service 104 includes a model selector 122 and a model deployer 124. In embodiments, the model selector 122 may receive an indication of sensor availability at a remote network/device of the client (e.g., client network 106*a* or a stand-alone client device). The indication may be a message that indicates the types and/or numbers of sensors currently available at the client network/device (e.g., available to provide data to a model at the hub device 108*a*). In embodiments, the message may be an indication of one or more types of input data that one or more sensors are configured to provide at the remote network/device (e.g., temperature data, pressure data, format of the data, any number of other types of environmental data, etc.) and/or an indication of one or more types of sensors configured to provide input data at the remote network/device (e.g., temperature sensor, pressure sensor, a particular model/manufacturer of sensor and/or configuration of sensor etc.).

In embodiments, the model selector may then select a new data processing model from among the group of available data processing models based at least on the sensor availability, model descriptors 126 (e.g., types of input data a model can process, performance of the model), and client-provided selection criteria 128 (e.g., performance requirements for the model). Examples of selection criteria are accuracy of results (e.g., at least 95% accuracy), speed (e.g., provide a result within a threshold period of time such as 10 milliseconds), or size of the data processing model (e.g., 10 gigabytes or less), and price of the model (e.g., charge for using or purchasing the model).

In the example embodiment, after the model selector selects one of the models 120 as a new model to be deployed, the model deployer 124 obtains the new model from the models 120 data store and deploys the new model (e.g., transmits the model) to the client network (e.g., to the hub device 108*a*). The hub device may then install the new model. In embodiments, the model 112 that was previously used may be uninstalled. In the depicted example, the new model may be compatible with the newly added sensor and other sensors and/or is better suited than the model to process data from the newly added sensor 114*n* and other sensors 114, whereas the model 112 is incompatible with the newly added sensor and other sensors and/or is not as well suited as the new model to process data from the newly added sensor 114*n* and other sensors 114.

As shown, the model selection and deployment service includes a management interface 130 that communicates (e.g., via an application programming interface) with a client administrator (e.g., via a management device 132 of the client network). For example, a client administrator may use a graphical user interface of the management device 132 to provide model selection criteria 128 and to upload one or more models 120 to the model selection and deployment service.

In embodiments, one or more of the sensors 114 detect environmental conditions (e.g., temperature, pressure, humidity, etc.) and generate data that indicates the detected environmental conditions. In some embodiments, one or more of the sensors detect performance and/or other operational aspects of the hub device and/or other devices at the client network (e.g., network bandwidth or traffic, power consumption, etc.) and generate data based on the detected performance. Thus, the data provided by the sensors may indicate environmental conditions at the client network and/or performance or other operational aspects of the client network.

By selecting and deploying models based on sensor availability as described herein, clients may dynamically update the data processing models on their networks based on changes in the availability of sensor devices. As a result, a client may continue to obtain reliable results and continue to operate, even when various sensors fail or are added over time. Moreover, the accuracy of predictions may be improved by automatically downloading new models when new sensors are added to client systems.

Figure 2:
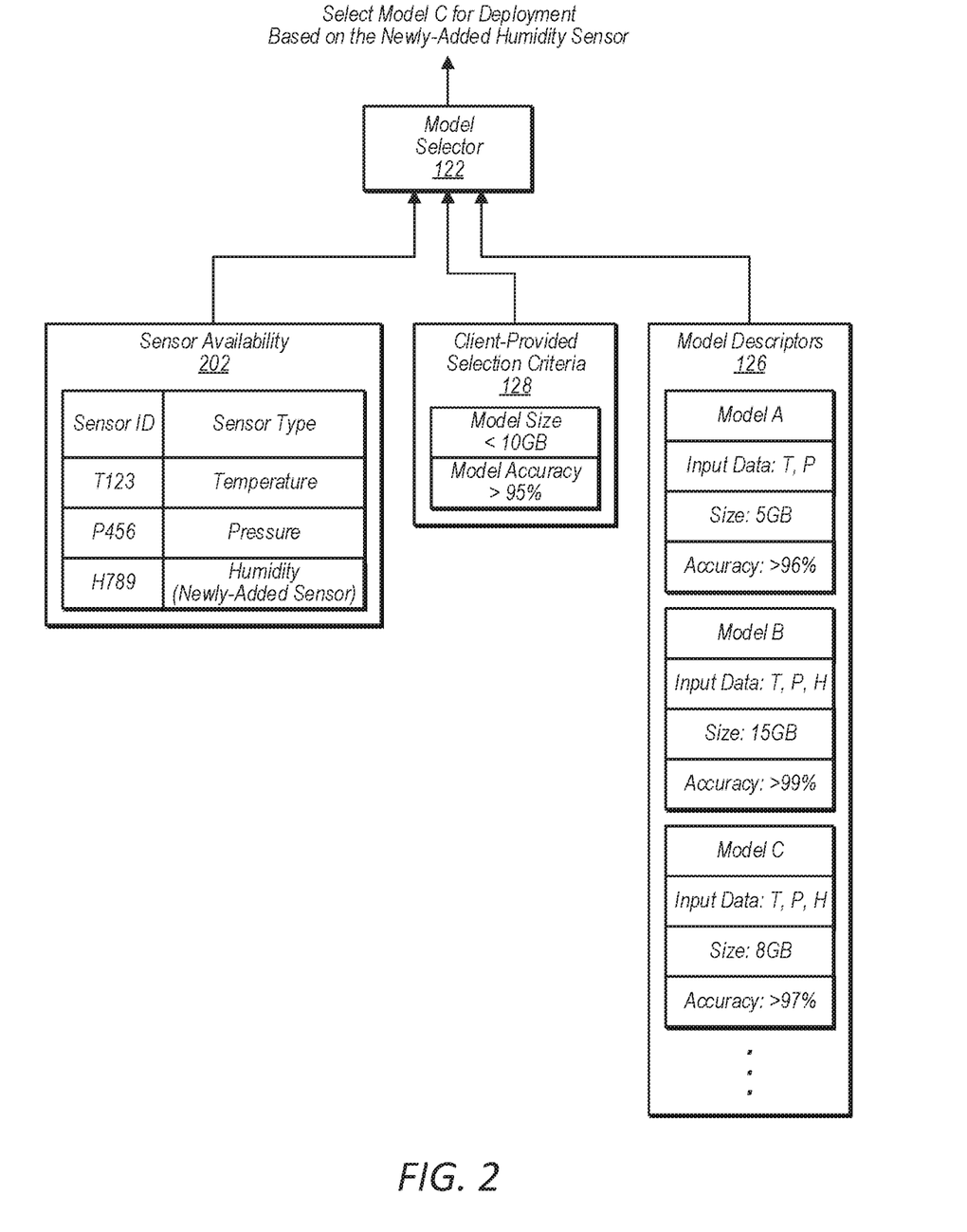
FIG. 2 illustrates an example of selecting a model based on sensor availability, according to some embodiments.

FIG. 2 illustrates an example of selecting a model based on sensor availability, according to some embodiments. In the depicted embodiment, the model selector 122 selects a data processing model from among data processing models (e.g., from the models 120 available for deployment) based at least on the sensor availability 202, the model descriptors 126, and the client-provided selection criteria 128.

In embodiments, an indication of the sensor availability 202 may be received by the provider network from a client's remote network (e.g., from a hub device). The client-provided selection criteria 128 may be specified and/or transmitted to the model selection and deployment service 104 to configure, initialize, and/or update the service according to the client's desired characteristics for models to be downloaded. In some embodiments, default service-provided selection criteria may be used (e.g., if the client does not provide any selection criteria for one or more parameters, such as model size, accuracy, etc.).

In various embodiments, a given model descriptor 126 for a model may indicate one or more types of input data (e.g., one or more aspects of the environment that can be measured by a sensor, such as temperature or pressure) that the model is configured to process and/or one or more types of sensors that the model is configured to process data from (e.g., temperature/pressure, sensor model number, etc.). A model descriptor may include any other number of parameters that may be compared to client-provided selection criteria 128 and/or the sensor availability 202 in order to determine/select one or more models that are most compatible and/or most suitable for deployment.

In the depicted example, the sensor availability 202 for a client network (e.g., received as a message/indication from a particular hub device of the client network) includes a temperature sensor, a pressure sensor, and a humidity sensor that has been newly added (e.g., a recently added sensor that the model selection and deployment service was previously unaware of). In embodiments, the client network may provide a unique identifier for each sensor (T123, P456, H789). In embodiments, a model number or other unique identifier may be provided, which the selection and deployment service may use to determine the type of sensor (e.g., temperature, pressure) and/or type of input data the sensor provides (e.g., temperature measurements, pressure measurements).

As shown, the client-provided selection criteria 128 specifies a model size that is less than 10 gigabytes and a model result accuracy greater than 95%. In embodiments, any number of criteria may be provided for a model (e.g., accuracy, speed, size, performance, power, price, etc.). As illustrated, model descriptors includes a first descriptor for model A that indicates model A is configured to process two types of input data (temperature and pressure), is 5 GB in size, and generates results with greater than 95% accuracy. Another descriptor for model B indicates that model B is configured to process three types of input data (temperature, pressure, and humidity), is 15 GB in size, and generates results with greater than 99% accuracy. Finally, model C is configured to process three types of input data (temperature, pressure, and humidity), is 8 GB in size, and generates results with greater than 97% accuracy.

In embodiments, any number of models may be available, and different models may be configured to generate a prediction/result based on processing different types of input data (e.g., different combinations and/or numbers of types of input data, such as temperature and pressure vs. temperature and pressure and humidity). A given model may be configured to generate a prediction/result based on processing any number of different types of input data. For example, a model may be configured to process 100 different types of environmental input data from 100 different types of environmental sensors. As shown, two or more models (e.g., models B and C) may be configured to generate a prediction/result based on processing the same types of (combination of) input data (e.g., temperature, pressure, and humidity), but one or more criteria-related aspects may be different between them (e.g., size, accuracy). As depicted, model A is configured to process different types of input data than models B and C (or a different "combination" of input data).

In the example embodiment, selection and deployment service previously selected and downloaded model A to a hub device of a client network so that the hub device could process data received from a temperature and a pressure sensor. As shown, model A meets the client-provided selection criteria. At a later point in time, the humidity sensor (e.g., with sensor ID H789) is installed. In response, the hub device sends an indication of the new sensor to the selection and deployment service. In the depicted example, the model selector 122 may select model C for deployment, because model C is capable of processing the 3 types of input data (e.g., temperature, pressure, and humidity) and model C meets the selection criteria for size and accuracy.

Figure 3:
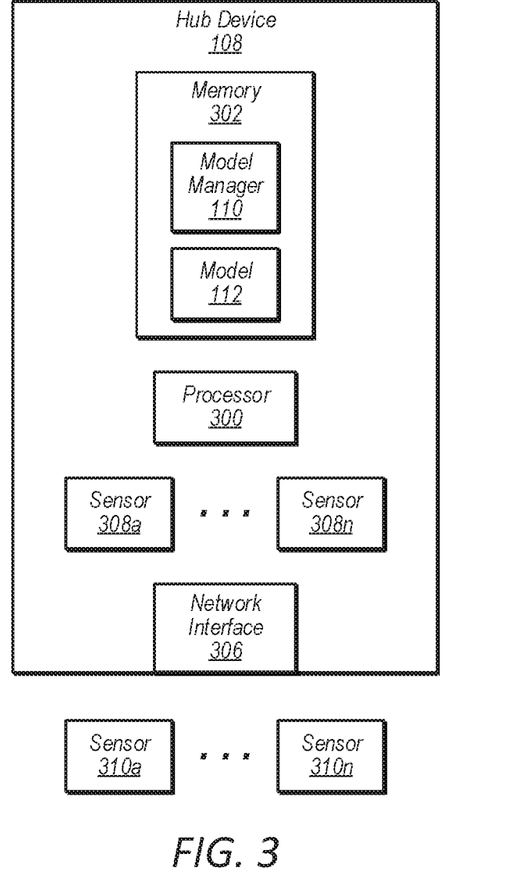
FIG. 3 is a block diagram of an example hub device that implements a model manager and a model, according to some embodiments.

FIG. 3 is a block diagram of an example hub device that implements a model manager and a model, according to some embodiments. In the depicted embodiment, the hub device 100 includes a processor 300, a memory 302, and a network interface 306. The memory 202 includes a model manager 110 and a local model 112. In embodiments, the hub device may include one or more batteries for power and/or may be powered by a power source external to the hub device (e.g., via a power line/electrical outlet).

In embodiments, the hub device may receive data from any number of sensors 308 physically attached to the hub device at least via physical wiring or other connectors and/or any number of sensors 310 what communicate wirelessly with the hub device. Thus, the hub device may transmit data to and receive data from sensors via the network interface (via wired and/or wireless transmission). Some examples of sensors include a microphone, camera, temperature sensing device, humidity detector, vibration detector, smoke detector, motion sensor, etc.

The processor 200 may be any suitable processor, such as a graphics processing unit (GPU), GPU accelerator, Field Programmable Gate Array (FPGA), Digital Signal Processor (DSP), DSP accelerator, or application-specific integrated circuit (ASIC). In embodiments, the ASIC may also include the memory 202 and/or any other component of FIG. 2.

Figure 4:
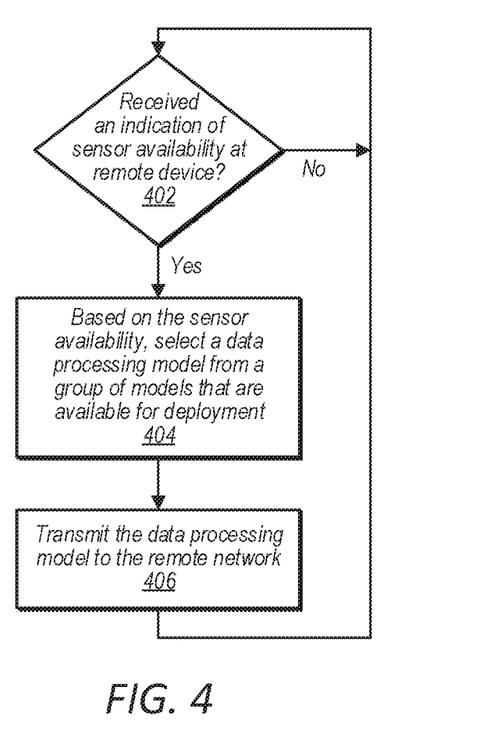
FIG. 4 is a flow diagram that illustrates selecting and deploying models based on sensor availability, according to some embodiments.

FIG. 4 is a flow diagram that illustrates selecting and deploying models based on sensor availability, according to some embodiments. At block 402, a model selection and deployment service determines whether an indication of sensor availability at a remote client network has been received. For example, the indication may be a message or request originating from a hub device. If not, then the process may wait for at least a threshold period of time before determining again whether any other indications have been received. If the indication of sensor availability has been received, then at block 404, based on the sensor availability, the model selection and deployment service selects a data processing model from a group of models that are available for deployment.

At block 406, the model selection and deployment service transmits the selected data processing model to the remote client network (e.g., to the hub device). The process then returns to block 402, where the model selection and deployment service determines whether another indication of sensor availability has been received (e.g., from the same client/client network or a different client/client network). If not, then the process may wait for at least a threshold period of time before determining again whether any other indications have been received.

Figure 5:
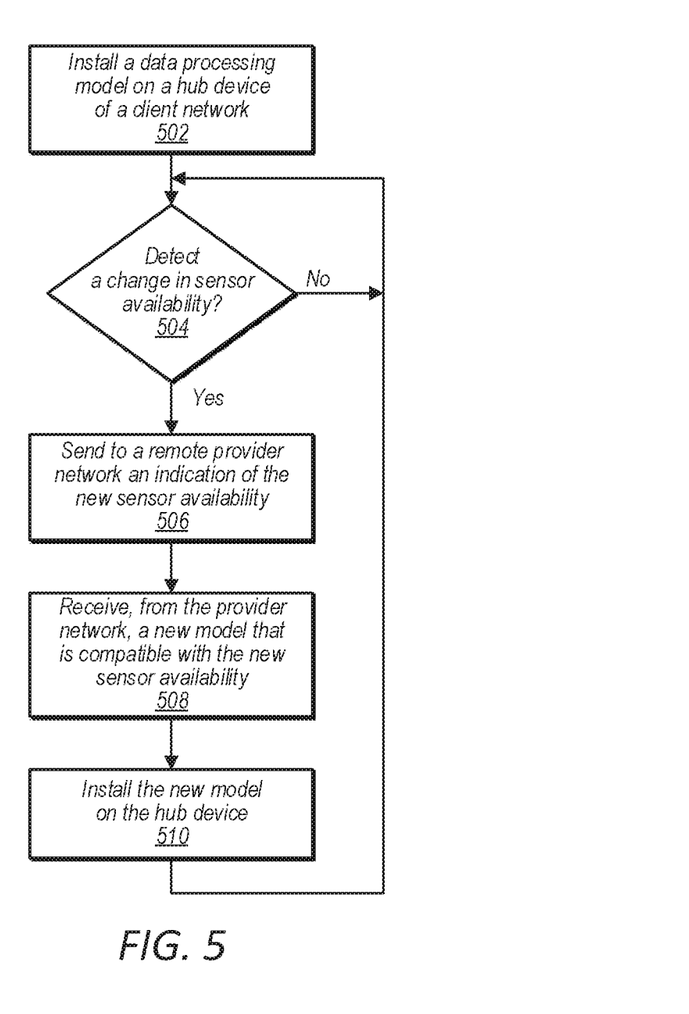
FIG. 5 is a flow diagram that illustrates detecting a change in sensor availability at a hub device of a client network and receiving a new model for installation on the hub device, according to some embodiments.

FIG. 5 is a flow diagram that illustrates detecting a change in sensor availability at a hub device of a client network and receiving a new model for installation on the hub device of a client network, according to some embodiments. In embodiments, a model manager or any other component may perform some or all of the actions described.

At block 502, the hub device installs a data processing model onto the hub device. At block 504, the hub device determines whether a change in sensor availability has occurred. For example, one or more sensors for the hub device may have recently been added, removed, and/or switched with a different sensor/type of sensor. If not, then the process may wait for at least a threshold period of time before determining again whether a change in sensor availability has occurred.

At block 504, if the hub device determines that a change in sensor availability has occurred, then at block 506, the hub device sends to the remote provider network (e.g., to the model selection and deployment service) an indication of the new sensor availability. In embodiments, the indication may be a request for a new model to be downloaded. For example, if the model manager determines that the currently installed model is incompatible with the new sensor availability and/or accuracy or performance of the model results is reduced due to the change in sensor availability, then the model manager may send a request for a new model to be downloaded. At block 508, the hub device receives, from the provider network, a new data processing model that is compatible with the new sensor availability and/or best suited for the new sensor availability out of the models available for deployment (e.g., most accurate for that sensor availability). At block 510, the hub device then installs the new model onto the hub device. The hub device may then begin to process data received from the new configuration of sensors.

In some embodiments, the hub device may not receive a new data processing model after sending the indication of the new sensor availability. For example, the currently installed model may be the best model to process data from the new sensor configuration. When the selection and deployment determines that the currently installed model is still the best model for the new sensor availability, then the service may send an instruction (e.g., message, indication, etc.) to continue using the new data processing model.

Figure 6:
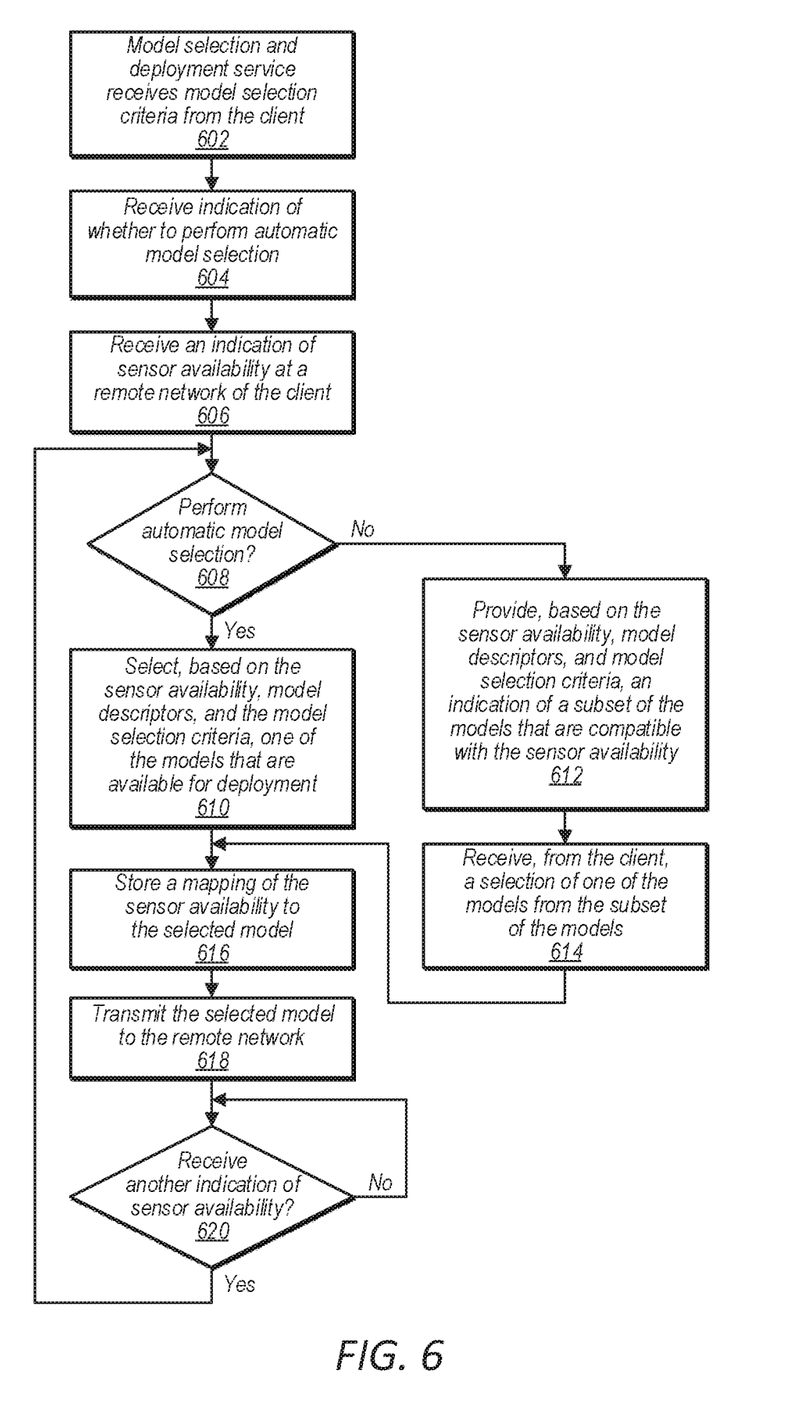
FIG. 6 is a flow diagram that illustrates selecting and deploying models based on sensor availability during an experimentation phase, according to some embodiments.

FIG. 6 is a flow diagram that illustrates selecting and deploying models based on sensor availability during an experimentation phase, according to some embodiments. In embodiments, the process described in FIG. 6 may be initially used during an "experimentation" phase in order for a client to determine the best models to use for different sensor configurations. As discussed herein, a "production"

phase may be entered after a sufficient number mappings of best models to different sensor configurations have been determined.

At block 602, the model selection and deployment service receives model selection criteria from the client (e.g., as part of the service configuration stage). At block 604, the model selection and deployment service receives an indication of whether to perform automatic model selection (e.g., as part of the service configuration stage).

At block 606, the model selection and deployment service receives an indication of sensor availability at a remote network/device of the client. At block 608, the model selection and deployment service determines whether to perform automatic model selection (e.g., a setting previously entered by the client during configuration). If so, then at block 610, the model selection and deployment service selects, based on the sensor availability, model descriptors, and/or model selection criteria, one of the models that are available for deployment.

Returning to block 608, if the model selection and deployment service determines not to perform automatic model selection (e.g., determining to perform manual/user selection instead), then at block 612, the model selection and deployment service provides, based on the sensor availability, model descriptors, and/or model selection criteria, an indication of a subset of the models that are compatible with the sensor availability. For example, any number of compatible models may be presented to a user in the form of a list or other graphical indication. At block 614, the model selection and deployment service receives, from the client (e.g., a user or client administrator using a management device), a selection of one of the models from the subset of compatible models (e.g., input via a keyboard, mouse, touchscreen, etc.). In embodiments, the list of models may be presented in order and/or ranked from the most compatible model to the least compatible model (e.g., based on the sensor availability, model descriptors, and the model selection criteria).

In embodiments, the indication of the subset of models that are compatible may include just one recommended model. For example, one model may be presented as the most compatible model (e.g., the most compatible model based on the sensor availability, model descriptors, and the model selection criteria). The user may then approve or reject the recommended model. If the user approves the recommended model, then the process proceeds to block 616. If the user rejects the recommended model, then another compatible model is presented to the user as another recommended model (e.g., the next most compatible model based on the sensor availability, model descriptors, and the model selection criteria). The user may approve or reject the other recommended model. The above process may occur any number of times until the user approves a recommended model. In embodiments, the user may specify and/or upload a client-provided model to the service if the user does not wish to approve any of the recommended models.

At block 616, the model selection and deployment service stores a mapping of the sensor availability to the selected model. As discussed herein, this mapping may eventually be used during the production phase of operation. At block 618, the model selection and deployment service transmits the selected model to the remote network/device.

At block 620, the model selection and deployment service determines whether another indication of sensor availability has been received (e.g., from the same client/client network or a different client/client network). If not, then the process may wait for at least a threshold period of time before determining again whether any other indications have been received. If, at block 620, the model selection and deployment service determines that another indication of sensor availability has been received, then the process returns to block 608.

In some embodiments, during the experimental phase, when the hub device sends an indication of sensor availability to the selection and deployment service, the indication may identify one or more previously installed data processing models that were previously used by the hub device to process sensor data and are compatible with the new sensor availability (in some cases, the service may already have a record of previously used models). When the model selector of the selection and deployment service selects a model based on the sensor availability, the model descriptors, and/or the selection criteria the model selector may first determine a group of several models that are compatible with the sensor availability, identify the model from that group with the highest accuracy and/or speed based on previous use by the hub device, and select that model for deployment. However, if one or more of those models have not yet been deployed/used by the hub device, then one of those models may be selected for deployment, so that the service may gather data for accuracy and/or speed. This data may then be used for future selection of a model from a group of models, as described above.

Figure 7:
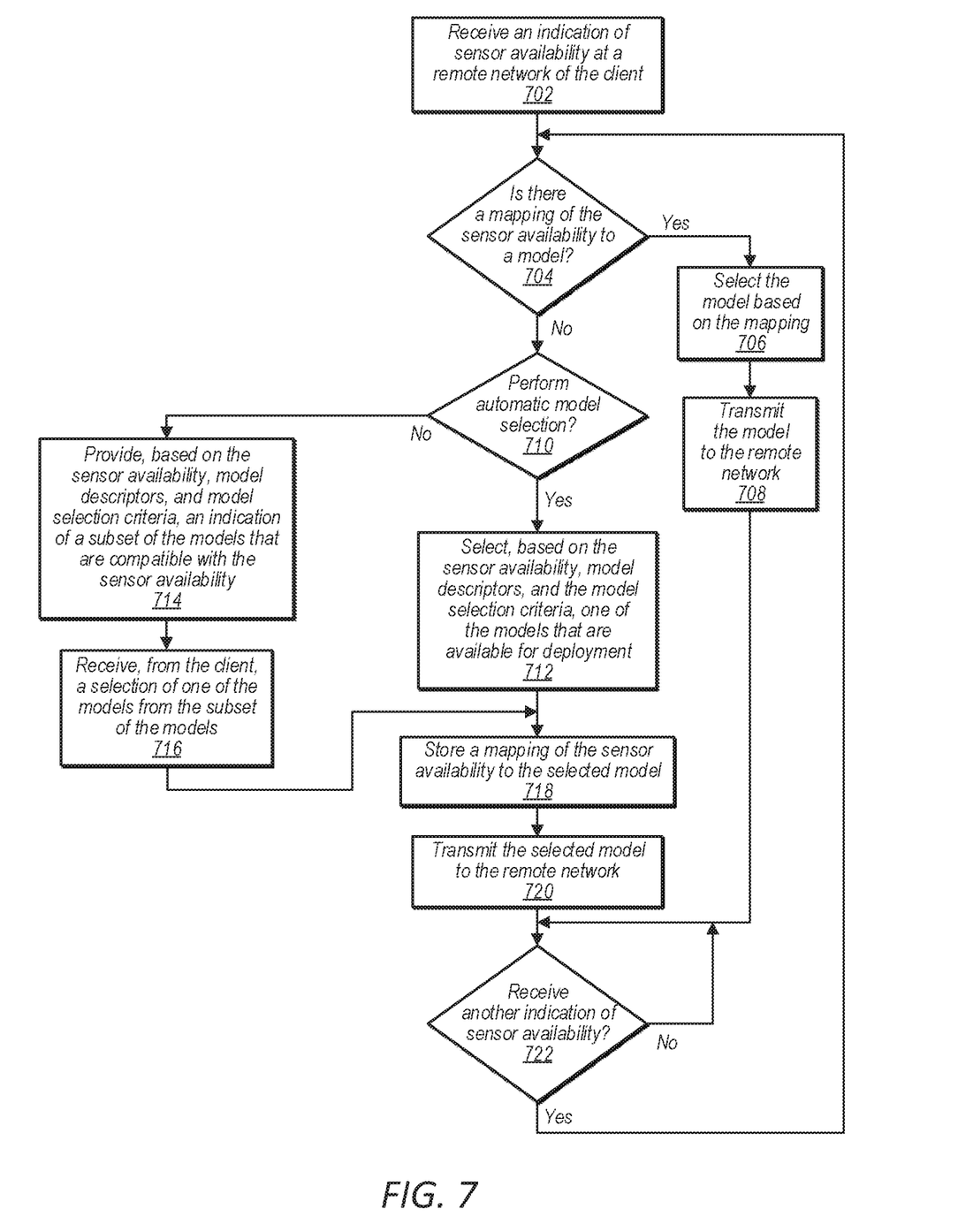
FIG. 7 is a flow diagram that illustrates selecting and deploying models based on sensor availability during a production phase, according to some embodiments.

FIG. 7 is a flow diagram that illustrates selecting and deploying models based on sensor availability during a production phase, according to some embodiments. In embodiments, the process described in FIG. 7 may be used during a "production" phase in order for a client to automatically select (e.g., based on mappings) the best models to use for different sensor configurations. In embodiments, the production phase may be entered after a sufficient number mappings of best models to different sensor configurations have been determined during the experimental phase.

At block 702, the model selection and deployment service receives an indication of sensor availability at a remote network of the client. At block 704, the model selection and deployment service determines whether there is a mapping of the sensor availability (e.g., the particular sensor configuration or combination of types of input data) to a particular model (e.g., stored in the models 120 data store). In embodiments, the mappings may be stored by the selection and deployment service at another data store of the provider network.

If the mapping of the sensor availability to a particular model exists, then at block 706, the model selection and deployment service selects the model based on the mapping and retrieves the selected model from the data store. At block 708, the model selection and deployment service then transmits the selected model to the remote client network.

Returning to block 704, if the model selection and deployment service determines that there is not a mapping of the sensor availability to a particular model, then the process may select and deploy a model in a same or similar way as described for the experimentation phase of FIG. 7. For example, the model selection and deployment service may, at block 710, determine whether to perform automatic model selection (e.g., a setting previously entered by the client during configuration). If so, then at block 712, the model selection and deployment service selects, based on the sensor availability, model descriptors, and/or model selection criteria, one of the models that are available for deployment.

Returning to block 710, if the model selection and deployment service determines not to perform automatic model selection (e.g., determining to perform manual/user selection instead), then at block 714, the model selection and deployment service provides, based on the sensor availability, model descriptors, and/or model selection criteria, an indication of a subset of the models that are compatible with the sensor availability. For example, any number of compatible models may be presented to a user in the form of a list or other graphical indication. At block 716, the model selection and deployment service receives, from the client (e.g., a user or client administrator using a management device), a selection of one of the models from the subset of compatible models (e.g., input via a keyboard, mouse, touchscreen, etc.). In embodiments, the list of models may be presented in order and/or ranked from the most compatible model to the least compatible model (e.g., based on the sensor availability, model descriptors, and the model selection criteria).

In embodiments, the indication of the subset of models that are compatible may include just one recommended model. For example, one model may be presented as the most compatible model (e.g., the most compatible model based on the sensor availability, model descriptors, and the model selection criteria). The user may then approve or reject the recommended model. If the user approves the recommended model, then the process proceeds to block 718. If the user rejects the recommended model, then another compatible model is presented to the user as another recommended model (e.g., the next most compatible model based on the sensor availability, model descriptors, and the model selection criteria). The user may approve or reject the other recommended model. The above process may occur any number of times until the user approves a recommended model. In embodiments, the user may specify and/or upload a client-provided model to the service if the user does not wish to approve any of the recommended models.

At block 718, the model selection and deployment service stores a mapping of the sensor availability to the selected model. At block 720, the model selection and deployment service transmits the selected model to the remote network.

At block 722, the model selection and deployment service determines whether another indication of sensor availability has been received (e.g., from the same client/client network or a different client/client network). If not, then the process may wait for at least a threshold period of time before determining again whether any other indications have been received. If, at block 722, the model selection and deployment service determines that another indication of sensor availability has been received, then the process returns to block 704.

Figure 8:
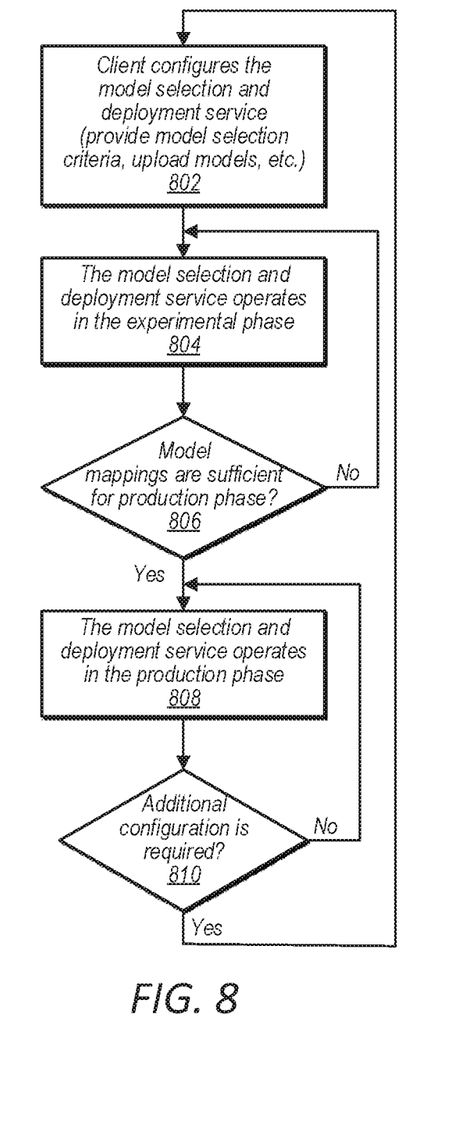
FIG. 8 is a flow diagram that illustrates transitioning between the experimentation phase and the production phase when selecting and deploying models based on sensor availability, according to some embodiments.

FIG. 8 is a flow diagram that illustrates transitioning between the experimentation phase and the production phase when selecting and deploying models based on sensor availability, according to some embodiments.

At block 802, a client of the model selection and deployment service configures the service to operate for one or more of the client's networks and/or one or more devices of the client's networks (e.g., hub devices). For example, a client administrator or user may provide model selection criteria, upload models, and/or provide other configuration data to the service.

At block 804, the model selection and deployment service begins operation for the client according to the experimental phase (e.g., FIG. 6). At block 806, the model selection and deployment service determines whether the mappings generated during the experimental phase are sufficient to begin operation in the production phase.

Any number of criteria may be used by the model selection and deployment service to make this determination. For example, the generated mappings may be sufficient if a threshold number of mappings to models has been generated, if a threshold amount of time has passed without a new model being deployed to the hub device and/or client network, if a rate of downloading new models to the hub device and/or client network is below a threshold rate, if a threshold number of new models are selected based on a mapping (e.g., over a recent threshold period of time), and/or if a threshold ratio of new models are selected based on a mapping (e.g., over a recent threshold period of time). In some embodiments, the client may manually start the production phase (e.g., proceed to block 808)

At block 808, the model selection and deployment service begins operation for the client according to the production phase (e.g., FIG. 7). At block 810, the model selection and deployment service determines whether additional configuration is required (e.g., whether to perform additional configuration and/or to begin the experimental phase again). If so, then the process returns to block 802. In embodiments, the process automatically begins the experimental phase if the client enters new configuration information. In some embodiments, the client may manually restart the experimental phase (e.g., proceed to block 804) without entering additional configuration information.

In some embodiments, the model selection and deployment service may determine additional configuration is required in response to determining any number of different criteria has been met. For example, the additional configuration may be required if a threshold number of new models are not selected based on a mapping (e.g., over a recent threshold period of time), and/or if a threshold ratio of new models are not selected based on a mapping (e.g., over a recent threshold period of time).

In some embodiments, some or all of the components of the model selection and deployment service may operate within the context of an event-driven execution environment. For example, one or more of the described functions of the model selection and deployment service may be assigned to respective events, such that a particular function is triggered in response to detection, by the event-driven execution environment, of an event assigned to the particular function (e.g., receiving an indication of sensor availability from a hub device). In embodiments, the function may include one or more operations to select a model for deployment (e.g., functions of the model selector).

Figure 9:
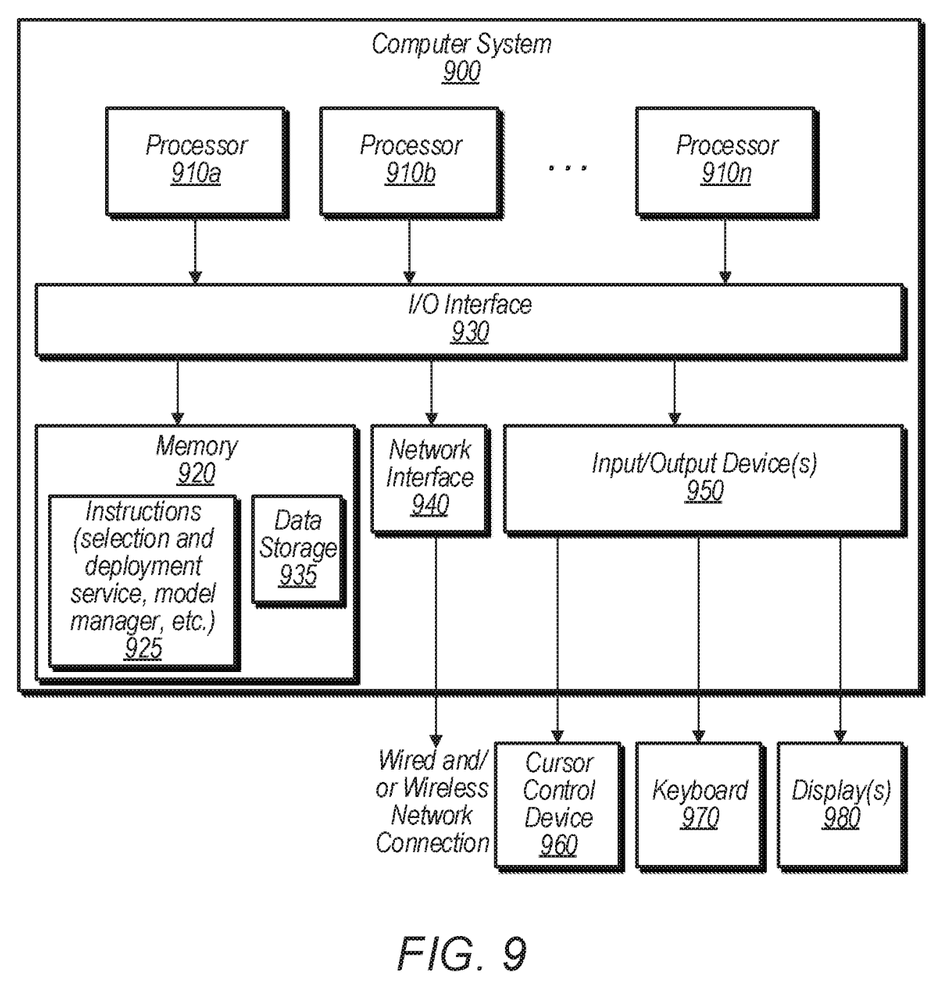
FIG. 9 is a block diagram illustrating an example computer system that implements some or all of the techniques described herein, according to some embodiments.

Any of various computer systems may be configured to implement processes associated with the provider network, model selection and deployment service, client network, hub device, or any other component of the above figures. For example, FIG. 9 is a block diagram illustrating an example computer system that implements some or all of the techniques described herein, according to some embodiments. In various embodiments, the provider network, model selection and deployment service, client network, hub device, or any other component of any of FIGS. 1-8 may each include one or more computer systems 900 such as that illustrated in FIG. 9. In embodiments, the provider network, model selection and deployment service, client network, hub device, or any other component may include one or more components of the computer system 900 that function in a same or similar way as described for the computer system 900.

In the illustrated embodiment, computer system 900 includes one or more processors 910 coupled to a system memory 920 via an input/output (I/O) interface 930. Computer system 900 further includes a network interface 940 coupled to I/O interface 930. In some embodiments, computer system 900 may be illustrative of servers implementing enterprise logic or downloadable application, while in other embodiments servers may include more, fewer, or different elements than computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be embedded processors implementing any of a variety of instruction set architectures (ISAs), such as the x106, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor 910. In various embodiments, system memory 920 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the provider network (e.g., the model selection and deployment service) or client network (e.g., the hub device) are shown stored within system memory 920 as program instructions 925. In some embodiments, system memory 920 may include data 935 which may be configured as described herein.

In one embodiment, I/O interface 930 may be configured to coordinate I/O traffic between processor 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may be configured to allow data to be exchanged between computer system 900 and other computer systems 900 or devices attached to a network, such as the local network discussed above, a wide-area network, or a local network within the provider network, for example. In particular, network interface 940 may be configured to allow communication between computer system 900 and/or various I/O devices 950. I/O devices 950 may include scanning devices, display devices, input devices and/or other communication devices, as described herein. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 900 via I/O interface 930. A computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In some embodiments, I/O devices 950 may be relatively simple or "thin" client devices. For example, I/O devices 950 may be configured as dumb terminals with display, data entry and communications capabilities, but otherwise little computational functionality. However, in some embodiments, I/O devices 950 may be computer systems configured similarly to computer system 900, including one or more processors 910 and various other devices (though in some embodiments, a computer system 900 implementing an I/O device 950 may have somewhat different devices, or different classes of devices).

In various embodiments, I/O devices 950 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 950 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 900. In general, an I/O device 950 (e.g., cursor control device 960, keyboard 970, or display(s) 980 may be any device that can communicate with elements of computing system 900.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the model selection and deployment service, hub device, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
    a data store comprising a plurality of data processing models available for deployment, wherein individual ones of the data processing models are configured to generate predictions based on processing different types of input data than other ones of the data processing models, and wherein a model descriptor for respective ones of the data processing models indicates types of input data the data processing model is configured to process;
    one or more processors; and
    one or more memories, wherein the one or more memories have stored thereon instructions, which when executed by the one or more processors, cause the one or more processors to implement a model selection and deployment service for one or more clients of a provider network, wherein the model selection and deployment service is configured to, for individual clients:
        receive, from a hub device of a remote site of the client, an indication of sensor availability for the hub device, wherein the indication of sensor availability comprises an indication of a type of input data currently available to the hub device from a sensor or a type of sensor currently available to provide input data to the hub device; and
        in response to receiving, from the hub device of the remote site of the client, the indication of sensor availability for the hub device:
            select, based at least on the type of input data currently available to the hub device from the sensor or the type of sensor currently available to provide input data to the hub device and the model descriptors, a data processing model from among the plurality of data processing models at the provider network, wherein the selected data processing model is configured to generate predictions based on processing different types of input data than input data for other data processing models of the plurality of data processing models available at the provider network for deployment; and
            transmit the data processing model to the remote site.

2. The system as recited in claim 1, wherein the model selection and deployment service is configured to receive, from the client, selection criteria for the remote site, and wherein to select a data processing model, the model selection and deployment service is configured to:
    select the data processing model from among the plurality of data processing models based at least on the sensor availability, the model descriptors, and the selection criteria, wherein the selection criteria comprises one or more of accuracy, speed, or size of the data processing model.

3. The system as recited in claim 1, wherein to select a data processing model, the model selection and deployment service is configured to:
    provide, based at least on the sensor availability and the model descriptors, an indication of a subset of the data processing models that are compatible with the sensor availability; and
    receive, from the client, a selection of the data processing model from among the subset of the data processing models.

4. The system as recited in claim 1, wherein the model selection and deployment service is configured to:
    select, based on a mapping of different sensor availabilities to different data processing models, another data processing model from among the plurality of data processing models.

5. The system as recited in claim 1, wherein the model selection and deployment service is configured to, subsequent to transmission of the data processing model to the remote site:
    receive an indication of another sensor availability at the remote site of the client, wherein the other sensor availability is different than the sensor availability;
    in response to receiving the indication of the other sensor availability:
        select, based at least on the other sensor availability and the model descriptors, a different data processing model from among the plurality of data processing models; and
        transmit the different data processing model to the remote site.

6. A method, comprising:
    performing, by one or more computing devices of a provider network that implement a model selection and deployment service for one or more clients:
        receiving, from a hub device of a remote site of a client, an indication of sensor availability for the hub device, wherein the indication of sensor availability comprises an indication of a type of input data currently available to the hub device from a sensor or a type of sensor currently available to provide input data to the hub device; and
        in response to receiving, from the hub device of the remote site of the client, the indication of sensor availability for the hub device:
            selecting, based at least on the type of input data currently available to the hub device from the sensor or the type of sensor currently available to provide input data to the hub device, a data processing model from among a plurality of data processing models at the provider network available for deployment, wherein the selected data processing model is configured to generate predictions based on processing different types of input data than input data for other data processing models of the plurality of data processing models available for deployment; and
            transmitting the data processing model to the remote site.

7. The method as recited in claim 6, wherein the selecting the data processing model further comprises:
selecting the data processing model from among the plurality of data processing models based at least on the sensor availability and selection criteria provided by the client, wherein the selection criteria comprises one or more of accuracy, speed, or size of the data processing model.

8. The method as recited in claim 6, wherein the selecting the data processing model further comprises:
selecting the data processing model from among the plurality of data processing models based at least on the sensor availability and model descriptors for the plurality of data processing models, wherein a model descriptor for respective ones of the data processing models indicates types of input data the data processing model is configured to process.

9. The method as recited in claim 6, wherein the indication of sensor availability for the hub device comprises:
an indication of different types of input data that different sensors are configured to provide at the remote site, or
an indication of different types of sensors configured to provide input data at the remote site.

10. The method as recited in claim 6, wherein selecting the data processing model comprises:
providing, based at least on the sensor availability, an indication of a subset of the data processing models that are compatible with the sensor availability; and
receiving, from the client, a selection of the data processing model from among the subset of the data processing models.

11. The method as recited in claim 6, further comprising:
selecting, based on a mapping of different sensor availabilities to different data processing models, the data processing model from among the plurality of data processing models.

12. The method as recited in claim 6, further comprising, subsequent to transmission of the data processing model to the remote site:
receiving an indication of a different sensor availability at the remote site of the client;
in response to receiving the indication of the different sensor availability:
selecting, based at least on the different sensor availability, a different data processing model from among the plurality of data processing models; and
transmitting the different data processing model to the remote site.

13. The method as recited in claim 6, wherein the selecting the data processing model further comprises:
selecting the data processing model from one or more of:
data processing models provided by the client and stored by the provider network,
data processing models provided by the model selection and deployment service and available for deployment to different clients, or
data processing models provided by a third party network.

14. At least one hub device connected to a network, the at least one hub device comprising:
one or more processors; and
one or more memories, wherein the one or more memories have stored thereon instructions, which when executed by the one or more processors, cause the one or more processors to implement a model manager configured to:
detect a change in a sensor availability that results in a new sensor availability;
in response to the detection of the change in sensor availability, send to a remote provider network an indication of the new sensor availability, wherein the indication of the new sensor availability comprises an indication of a type of input data currently available to the hub device from a sensor or a type of sensor currently available to provide input data to the hub device;
receive, from the provider network, the new data processing model, wherein the new data processing model is compatible with the new sensor availability, and wherein the new data processing model is configured to generate predictions based on processing different types of input data than input data for other data processing models of a plurality of data processing models available at the provider network for deployment; and
install the new data processing model.

15. The at least one hub device of claim 14, wherein the model manager is configured to:
prior to the installation of the new data processing model, uninstall a currently installed data processing model.

16. The at least one hub device of claim 14, wherein the model manager is configured to:
identify one or more previously installed data processing models that were previously used by the at least one hub device to process sensor data and are compatible with the new sensor availability, wherein sending the indication of the new sensor availability further comprises sending an indication of the one or more previously installed data processing models.

17. The at least one hub device of claim 16, wherein to receive, from the provider network, the new data processing model, the model manager is configured to:
receive one of the previously installed data processing models, or
receive a data processing model that has not yet been used by the hub device.

18. The at least one hub device of claim 14, wherein the model manager is configured to:
train the new data processing model based on data collected by one or more sensors to generate an updated data processing model; and
transmit the updated data processing model to the provider network.

19. The at least one hub device of claim 14, wherein the model manager is configured to:
detect another change in the sensor availability that results in a different sensor availability;
in response to the detection of the other change in sensor availability, send to the remote provider network another indication of the different sensor availability; and
receive, from the provider network, an instruction to continue using the new data processing model.

20. The at least one hub device of claim 14, wherein the new sensor availability results from addition of a new sensor configured to provide a new type of input data, and wherein the model manager is configured to:
identify the new type of input data or a type of the new sensor, wherein sending the indication of the new sensor availability comprises sending an indication of the new type of input data or the type of the new sensor.

* * * * *